(12) United States Patent
Lee et al.

(10) Patent No.: US 10,882,262 B2
(45) Date of Patent: Jan. 5, 2021

(54) FLEXIBLE MANDREL FOR FORMING COMPOSITE STRUCTURES

(71) Applicant: The Boeing Company, Chicago, IL (US)

(72) Inventors: Michael A. Lee, Kent, WA (US); Jennifer Sue Noel, Kent, WA (US); John Dempsey Morris, Seattle, WA (US)

(73) Assignee: The Boeing Company, Chicago, IL (US)

(*) Notice: Subject to any disclaimer, the term of this patent is extended or adjusted under 35 U.S.C. 154(b) by 189 days.

(21) Appl. No.: 16/108,680

(22) Filed: Aug. 22, 2018

(65) Prior Publication Data
US 2020/0061939 A1 Feb. 27, 2020

(51) Int. Cl.
| | |
|---|---|
| *B29C 70/44* | (2006.01) |
| *B32B 37/10* | (2006.01) |
| *B29C 33/40* | (2006.01) |
| *B29C 70/34* | (2006.01) |
| *B29D 99/00* | (2010.01) |
| *B32B 38/18* | (2006.01) |
| *B29C 33/38* | (2006.01) |
| *B29L 31/30* | (2006.01) |

(52) U.S. Cl.
CPC .......... *B29C 70/446* (2013.01); *B29C 33/40* (2013.01); *B29C 70/345* (2013.01); *B29D 99/0003* (2013.01); *B32B 37/10* (2013.01); *B32B 38/1858* (2013.01); *B29C 2033/385* (2013.01); *B29L 2031/3076* (2013.01)

(58) Field of Classification Search
CPC ................................................ B29C 2033/385
See application file for complete search history.

(56) References Cited

U.S. PATENT DOCUMENTS

| | | | |
|---|---|---|---|
| 7,357,166 B2 | 4/2008 | Pham et al. | |
| 8,534,339 B2 | 9/2013 | Pham et al. | |
| 2011/0259515 A1* | 10/2011 | Rotter | B29C 70/382 156/285 |
| 2011/0277918 A1* | 11/2011 | Lee | B29C 33/505 156/156 |
| 2014/0116610 A1* | 5/2014 | Thomas | B32B 37/10 156/250 |
| 2015/0137424 A1* | 5/2015 | Lyons | B29C 70/342 264/317 |
| 2017/0275463 A1* | 9/2017 | Medoff | C08H 6/00 |

\* cited by examiner

*Primary Examiner* — Christopher T Schatz
(74) *Attorney, Agent, or Firm* — Yee & Associates, P.C.

(57) ABSTRACT

A composite manufacturing system for aircraft structures is provided. The composite manufacturing system comprises a tool for forming a composite structure, a vacuum bag, and a tool base. The tool comprises cured composite planks and layers of flexible material. The cured composite planks run parallel to each other. The layers of flexible material are positioned between and bonded to the cured composite planks. The vacuum bag surrounds the tool and is configured to apply pressure to the tool during curing of the composite structure. The tool is configured to deform in response to the pressure and prevent poor quality laminate and/or anomalies from developing in the composite structure during curing. The tool base is configured to hold the tool in place as it deforms.

20 Claims, 10 Drawing Sheets

FLEXIBLE MANDREL FOR FORMING COMPOSITE STRUCTURES

BACKGROUND INFORMATION

1. Field

The present disclosure relates generally to manufacturing composite structures. More specifically, the present disclosure relates to flexible mandrels used in manufacturing composite structures for aircraft applications.

2. Background

Manufacturers increasingly use composite structures to provide light-weight and structurally sound parts for various applications. Many of these composite structures are manufactured using vacuum bag processing. With such techniques, composite material is laid up on a tool and cured using heat and pressure to form a desired shape for the part. During curing, a vacuum bag surrounds the part and a vacuum applies pressure to contour the composite material against the tool. After curing, the composite structure is removed from the fabrication system for further processing.

One or more tools may be used when forming the composite structure. For example, composite material may be laid up on a set of mandrels prior to bagging and curing. These tools are designed to withstand manufacturing conditions and may comprise many different types of materials such as metal, metal alloy, or other suitable materials. The behavior of these materials affects the shape and quality of the cured composite part. Tools having metals may be stiffer than desired, causing gap conditions between the layers of composite material on the tool. As a result, the composite part may have an undesired laminate quality. The part may then need to be reworked or discarded, thus increasing the cost and time required to fabricate a suitable part.

Therefore, it would be desirable to have a method and apparatus that takes into account at least some of the issues discussed above, as well as other possible issues.

SUMMARY

An illustrative embodiment of the present disclosure provides a composite manufacturing system comprising a tool and a vacuum bag surrounding a tool. The tool is used to form a composite structure. The tool comprises cured composite planks running parallel to each other and layers of flexible material positioned between and bonded to the cured composite planks. The vacuum bag is configured to apply pressure to the tool.

Another illustrative embodiment of the present disclosure provides a method for forming a composite structure. Composite material is laid up on a tool. The tool comprises cured composite planks running parallel to each other and layers of flexible material positioned between and bonded to the cured composite planks. The composite material and the tool are surrounded with a single vacuum bag. Pressure is applied to the composite material and the tool using the vacuum bag. The composite material is cured to form the composite structure. During curing, the tool deforms to prevent poor laminate qualities, anomalies, or both from forming in the composite structure during curing.

A further illustrative embodiment of the present disclosure provides a composite manufacturing system for forming an aircraft structure. The composite manufacturing system comprises a first mandrel, a second mandrel positioned parallel and adjacent to the first mandrel, and a vacuum bag. The first mandrel has a first plurality of cured composite planks running parallel to each other and a first number of layers of flexible material positioned between and bonded to the first plurality of cured composite planks. The second mandrel has a second plurality of cured composite planks running parallel to each other and a second number of layers of flexible material positioned between and bonded to the second plurality of cured composite planks. The vacuum bag surrounds the first mandrel and the second mandrel. The vacuum bag is configured to apply pressure to a composite material positioned over the first mandrel and the second mandrel to form the aircraft structure.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
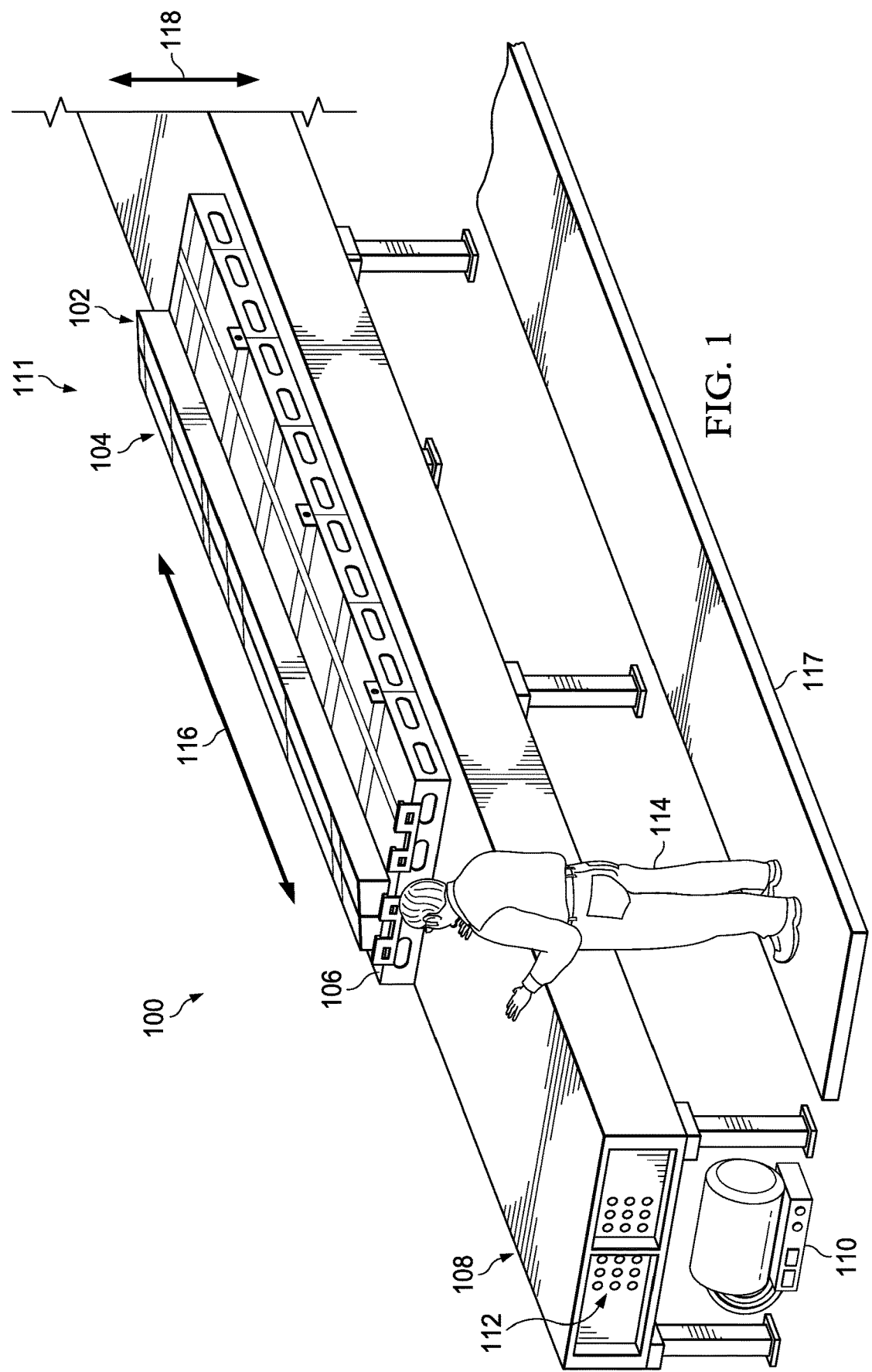
FIG. 1 is an illustration of a perspective view of a composite manufacturing system in accordance with an illustrative embodiment.

The illustrative embodiments recognize and take into account one or more different considerations. For example, the illustrative embodiments recognize and take into account that current manufacturing processes for composite structures may result in composite parts that do not meet specifications. Some fabrication systems use mandrels comprised of metal or metal alloy materials. Metal mandrels may not flex appropriately under vacuum and/or pressure, resulting in decreased laminate quality. This problem is magnified when forming long aircraft structures such as stringers. The stiffness of the mandrel results in separation between the layers of composite material along the length of the part, especially in ply drop locations. These web wrinkle defects may make the parts unusable in an aircraft wing. Alternately, the parts will need rework, thus costing manufacturers additional time and money.

The illustrative embodiments also recognize and take into account that different types of aircraft parts may need different levels of stiffness in tooling to promote laminate quality. Currently used systems may not have the design flexibility to easily accommodate such changes in manufacturing specifications.

Further, the illustrative embodiments recognize and take into account that the composite fabrication process is often more time-consuming than desired. Some composite fabrication systems require multiple vacuum bags for one part under cure. Areas to be bagged must be prepped, cleaned, and taped appropriately. Each additional bag increases the chance of tearing or damage to the bag or system, possibly slowing down the process and increasing the cost of manufacturing.

In addition, currently employed fabrication assemblies may be complex, heavy, and ergonomically challenging. Operators must move heavy metal mandrels into place, extract the part from such mandrels, and move the assembly from one location to another. Some fabrication systems manufacture stringers vertically, presenting even more ergonomic challenges for human operators. The height of the assembly makes it more difficult to work on. Operators may face repetitive strain or risk other injury risk.

Thus, the disclosed embodiments relate to a low cost, ergonomically advantageous composite manufacturing system that includes a set of flexible mandrels tuned to the appropriate stiffness to promote laminate quality for a composite part. The composite manufacturing system comprises a first mandrel, a second mandrel positioned adjacent to the first mandrel, and a vacuum bag. The first mandrel has a first plurality of cured composite planks running parallel to each other and a first number of layers of flexible material positioned between and bonded to the first plurality of cured composite planks. The second mandrel has a second plurality of cured composite planks running parallel to each other and a second number of layers of flexible material positioned between and bonded to the second plurality of cured composite planks. The vacuum bag surrounds the first mandrel and the second mandrel. The vacuum bag is configured to apply pressure to a composite material positioned over the first mandrel and the second mandrel to form the aircraft structure. With an illustrative embodiment, a single vacuum bag may be used.

With reference now to the figures and, in particular, with reference to FIG. 1, an illustration of a perspective view of a composite manufacturing system is depicted in accordance with an illustrative embodiment. Composite manufacturing system 100 comprises a combination of components and/or devices capable of employing vacuum bag techniques to consolidate and cure composite material to form an aircraft part.

In this illustrative example, composite manufacturing system 100 includes mandrel 102, mandrel 104, tool base 106, support structure 108, and air pressure control system 110. Mandrel 102 and mandrel 104 form tool 111 collectively. Support structure 108 has vacuum ports 112 that are in fluid communication with air pressure control system 110 and a vacuum bag through vacuum lines (not shown in this view).

Mandrel 102 and mandrel 104 are used to form a composite stringer for an aircraft wing in this illustrative example. Composite material is laid up over mandrel 102 and mandrel 104, as show in FIG. 5. When air pressure control system 110 pulls a vacuum on the vacuum bag, the composite material forms over mandrel 102 and mandrel 104 in a desired manner.

Tool base 106 is configured to accommodate a second set of mandrels in this illustrative example. In other words, two more mandrels may be secured to the other side of tool base 106 such that two stringers may be formed at the same time.

Human operator 114 may perform processes on the parts fabricated by composite manufacturing system 100. Tool base 106 moves in the direction of arrows 116 to allow for multiple configurations on support structure 108. Human operator 114 may stand on platform 117. Platform 117 may move in the direction of arrows 118 to adjust the height of mandrel 102 and mandrel 104 relative to human operator 114.

Figure 2:
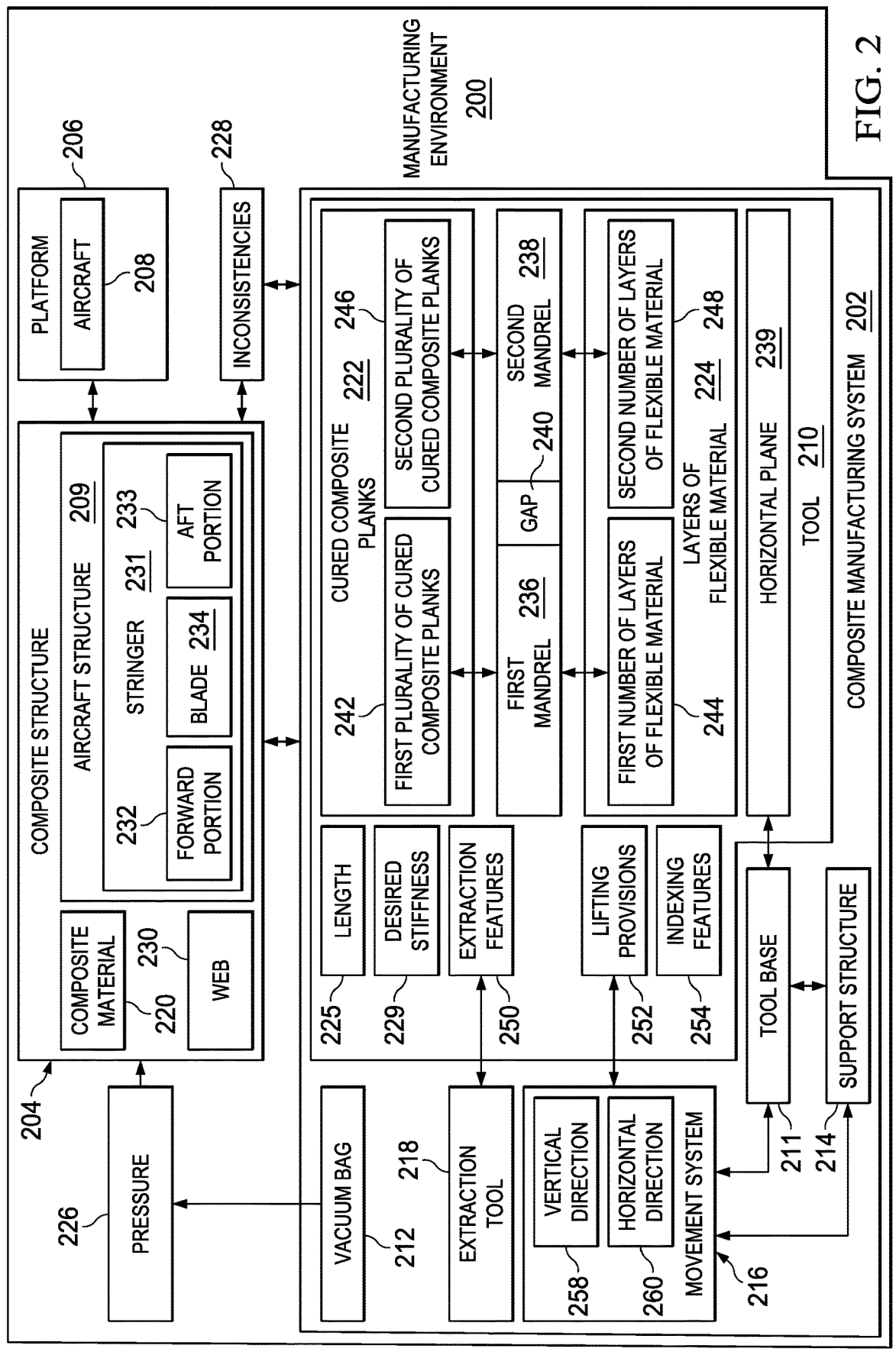
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 is an environment where components within composite manufacturing system 202 may be used to fabricate composite structure 204. Specifically, components within composite manufacturing system 202 may be used to form and cure composite structure 204.

Composite structure 204 is a structure configured for use in platform 206. Platform 206 may be, for example, without limitation, a mobile platform, a stationary platform, a land-based structure, an aquatic-based structure, or a space-based structure. More specifically, the platform may be an aircraft, a surface ship, a tank, a personnel carrier, a train, a spacecraft, a space station, a satellite, a submarine, an automobile, a power plant, a bridge, a dam, a house, a manufacturing facility, a building, and other suitable platforms.

Platform 206 takes the form of aircraft 208 in this illustrative example. When composite structure 204 is manufactured for aircraft 208, composite structure 204 takes the form of aircraft structure 209. Aircraft structure 209 may be, for example, without limitation, a stringer, a spar, a rib, a stabilizer, a panel, or some other suitable structure configured for use in aircraft 208.

As depicted, composite manufacturing system 202 comprises tool 210, tool base 211, vacuum bag 212, support structure 214, movement system 216, and extraction tool 218. Tool 210 may comprise a single mandrel or a set of mandrels, depending on the particular implementation.

As illustrated, tool 210 comprises cured composite planks 222 and layers of flexible material 224. Cured composite planks 222 run parallel to each other, aligned adjacent to one another, down length 225 of tool 210. In other words, cured composite planks 222 run down the elongate portion of tool 210 from one end of tool 210, down length 225 to the other end of tool 210.

Layers of flexible material 224 are positioned between and bonded to cured composite planks 222. One of layers of flexible material 224 is sandwiched between two of cured composite planks 222 in this illustrative example.

Cured composite planks 222 are configured to provide a stiffness component for tool 210. Cured composite planks 222 may comprise a number of different materials. For example, without limitation, cured composite planks 222 may comprise at least one of bismaleimide, a carbon fiber epoxy, a carbon fiber reinforced plastic, fiberglass, or other suitable materials. In this illustrative example, tool 210 has desired stiffness 229 determined by at least one of the number, the thickness, or the shape of cured composite planks 222.

Layers of flexible material 224 are configured to provide a desired level of flexibility for tool 210. Layers of flexible material 224 may comprise at least one of a rubber, a fluoroelastomer, silicone, or some other suitable material with relatively more flexible properties.

Cured composite planks 222 are pre-cured structures used to form tool 210. During formation of tool 210, cured composite planks 222 are co-bonded to one another using layers of flexible material 224 to form the completed tool.

In this illustrative example, tool base 211 is configured to hold tool 210 in place during curing of composite material 220. Tool base 211 may comprise various components to lock tool 210 in place. Tool base 211 also may be configured to move tool 210 in one or more directions.

As depicted, vacuum bag 212 surrounds tool 210 and composite material 220. During formation of composite structure 204, vacuum bag 212 applies pressure 226 to tool 210 and composite material 220.

Tool 210 is designed to substantially reduce inconsistencies 228. Inconsistencies 228 may include, for example, without limitation, poor laminate quality, delamination, voids, or other anomalies. Because tool 210 is comprised of flexible materials, tool 210 is configured to deform in a desired manner in response to pressure 226 and prevent inconsistencies 228 from developing in composite structure 204 during curing. In other words, tool 210 is configured to flex along its length 225 toward web 230 of composite structure 204. Thus, tool 210 may bend, flex, and twist such that separation does not occur between layers of composite material 220 outside selected tolerances.

Composite structure 204 takes the form of stringer 231 in this illustrative example. A set of mandrels is needed to form stringer 231 as it comprises forward portion 232, aft portion 233, and blade 234.

In this illustrative example, tool 210 comprises first mandrel 236 and second mandrel 238. First mandrel 236 and second mandrel 238 lie adjacent to each other on horizontal plane 239. Gap 240 is located in between first mandrel 236 and second mandrel 238. First mandrel 236 and second mandrel 238 may be tuned to desired stiffness 229 (or flexibility) by varying the thickness of one or more cured composite planks therein.

During manufacturing of stringer 231, composite material 220 is laid up on first mandrel 236 and second mandrel 238 in a desired manner. Composite material 220 may take the form of pre-preg in some illustrative examples. In other illustrative examples, composite material 220 may comprise preform and resin infused into the composite preform prior to curing.

In this illustrative example, first mandrel 236 may be used to form forward portion 232 of stringer 231 while second mandrel 238 may be used to form aft portion 233 of stringer 231. Gap 240 is configured to form blade 234 of stringer 231.

No metal is used to form first mandrel 236 and second mandrel 238 in this illustrative example. Instead, first mandrel 236 and second mandrel 238 each comprise multiple layers of material, such layers alternating between planks of pre-cured composite material and flexible material with adhesive properties.

Specifically, first mandrel 236 has first plurality of cured composite planks 242 and first number of layers of flexible material 244. As used herein, "a number of" when used with reference to items means one or more items. Thus, a number of layers of flexible material is one or more layers of flexible material.

First plurality of cured composite planks 242 run parallel to each other down length 225 of first mandrel 236. First number of layers of flexible material 244 are positioned between and bonded to first plurality of cured composite planks 242. One of first number of layers of flexible material 244 is sandwiched between two of first plurality of cured composite planks 242 in this illustrative example.

In a similar fashion, second mandrel 238 has second plurality of cured composite planks 246 and second number of layers of flexible material 248. The number, shape, thickness, and type of cured composite planks forming second mandrel 238 may be the same or different than the number used to form first mandrel 236. The number, shape, thickness, and type of layers of flexible material forming second mandrel 238 may be the same or different than the number used to form first mandrel 236. Desired stiffness 229 may be the same or different for first mandrel 236 than it is for second mandrel 238.

Second plurality of cured composite planks 246 run parallel to each other down length 225 of second mandrel 238. Second number of layers of flexible material 248 are positioned between and bonded to second plurality of cured composite planks 246. One of second number of layers of flexible material 248 is sandwiched between two of second plurality of cured composite planks 246 in this illustrative example.

When first mandrel 236 and second mandrel 238 are used, vacuum bag 212 surrounds both mandrels and applies pressure 226 to composite material 220 positioned over first mandrel 236 and second mandrel 238 to form stringer 231. A single pre-made envelope nylon bag with a breather and release film can be used for vacuum bag 212. Using a single pre-made nylon bag decreases manufacturing time for stringer 231. Cleaning, tape, and other processes may not be needed.

As illustrated, tool 210 may comprise extraction features 250, lifting provisions 252, and indexing features 254. Such features may be present on one or all mandrels when tool 210 comprises more than one mandrel.

In this illustrative example, extraction features 250 are associated with first mandrel 236 and second mandrel 238. Extraction features 250 are configured to mechanically connect to extraction tool 218. Extraction tool 218 is used to separate first mandrel 236 from second mandrel 238 to retrieve stringer 231. Extraction features 250 may be positioned at desired intervals along the outside of each mandrel. Extraction features 250 may be attached to the mandrels or formed as part of each mandrel.

Lifting provisions 252 may be associated with tool 210, tool base 211, or both. Lifting provisions 252 are configured to mechanically connect to movement system 256 that lifts and maneuvers tool 210.

In this illustrative example, indexing features 254 may be associated with tool 210, tool base 211, or both. Indexing features 254 are configured to aid in aligning composite material 220 on tool base 211.

As depicted, support structure 214 is associated with tool base 211. Tool base 211 may be mechanically connected to support structure 214.

Support structure 214 is configured to move in at least one of vertical direction 258 or horizontal direction 260. Support structure 214 may use movement system 256 to move in either direction. In some illustrative examples, tool base 211 is configured to move in vertical direction 258, horizontal direction 260, or both, relative to a human operator. In still other illustrative examples, the human operator stands on a platform that moves in either direction relative to support structure 214, tool base 211, or both.

Composite manufacturing system 202 may comprise additional components not shown with reference to FIG. 2. For example, composite manufacturing system 202 may include vacuum ports, supply lines, an air pressure regulation system, an autoclave, robotic operators, human operators, or other items typically used in manufacturing composite structures.

With an illustrative embodiment, manufacturing composite structure 204 may take less time than with currently used systems. Mandrels used to form composite structure 204 will deform in a desired manner during curing, thus substantially reducing inconsistencies 228 seen with currently employed fabrication systems. The design of each mandrel can be tailored to the needs the manufacturer, the platform, and the part to provide desired stiffness 229 and promote quality laminates. The illustrative embodiments allow for pre-made bagging to be used. The system no longer needs to be cleaned and taped to accommodate multiple bags. Human operators have the benefit of ergonomically designed tool movement, further reducing the risk of injury and saving time during manufacturing.

Figure 3:
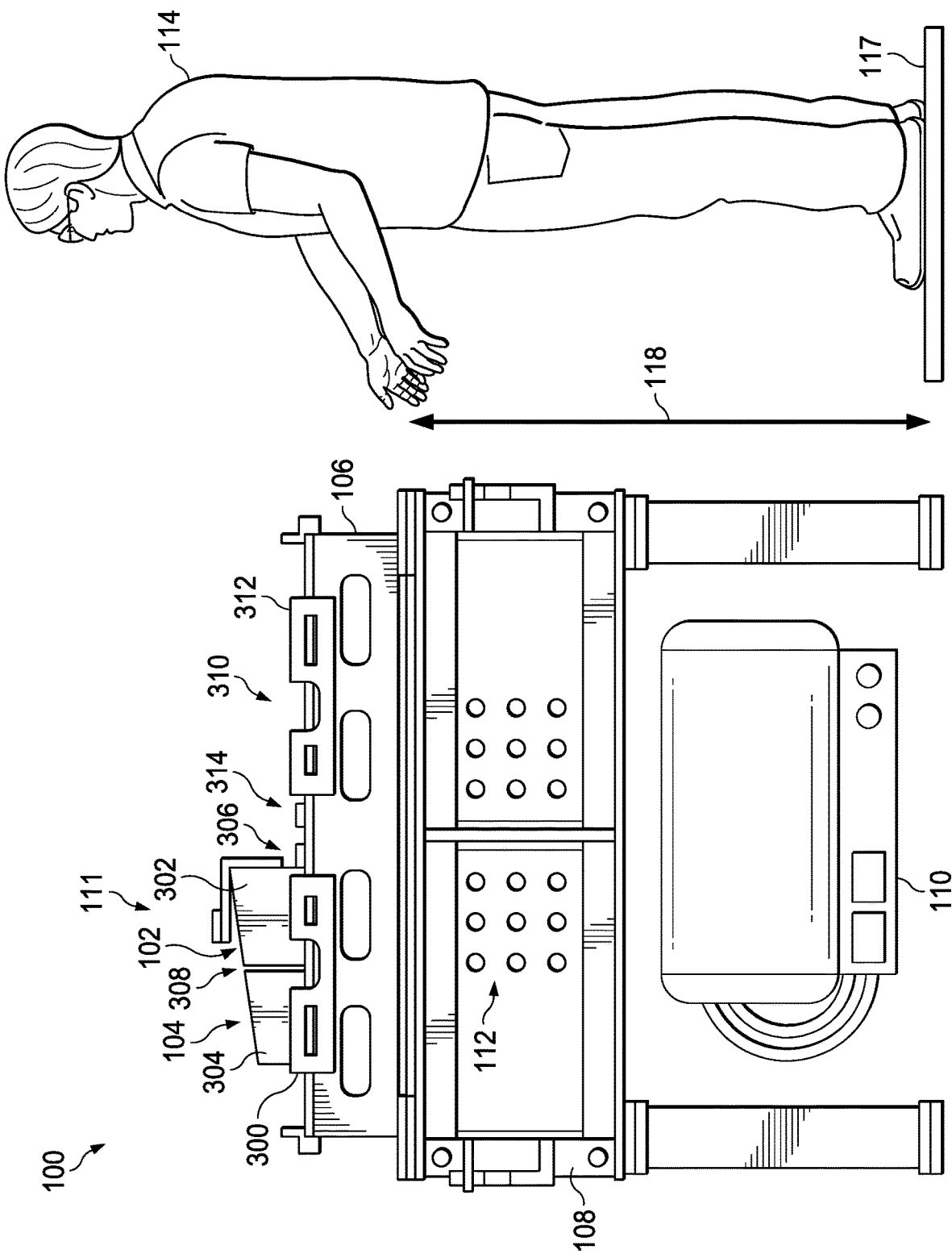
FIG. 3 is an illustration of an end view of a composite manufacturing system in accordance with an illustrative embodiment.

With reference next to FIG. 3, an illustration of an end view of a composite manufacturing system is depicted in accordance with an illustrative embodiment. An end view of composite manufacturing system 100 from FIG. 1 is shown. FIG. 3 illustrates an example of physical implementations of components within composite manufacturing system 202 as shown in block form in FIG. 2.

As illustrated, mandrel 102 and mandrel 104 are indexed to tool base 106 using bracket 300. Specifically, bracket 300 indexes end 302 of mandrel 102 and end 304 of mandrel 104 to tool base 106.

In this illustrative example, stabilizers 306 are positioned along the surface of tool base 106. Stabilizers 306 are configured to prevent undesired movement and shifting of mandrel 102 and mandrel 104 in the horizontal direction during curing. A portion of stabilizers 306 may be positioned next to and associated with mandrel 102 and a portion (not shown in this view) are positioned next to and associated with mandrel 104. Gap 308 is present between mandrel 102 and mandrel 104.

Area 310 of tool base 106 does not have mandrels in this illustrative example. However, area 310 is designed to accommodate a set of mandrels. Bracket 312 may be used to index a set of mandrels to tool base 106 in area 310. Stabilizers 314 may substantially limit undesired movement of such mandrels in the horizontal direction during curing.

Figure 4:
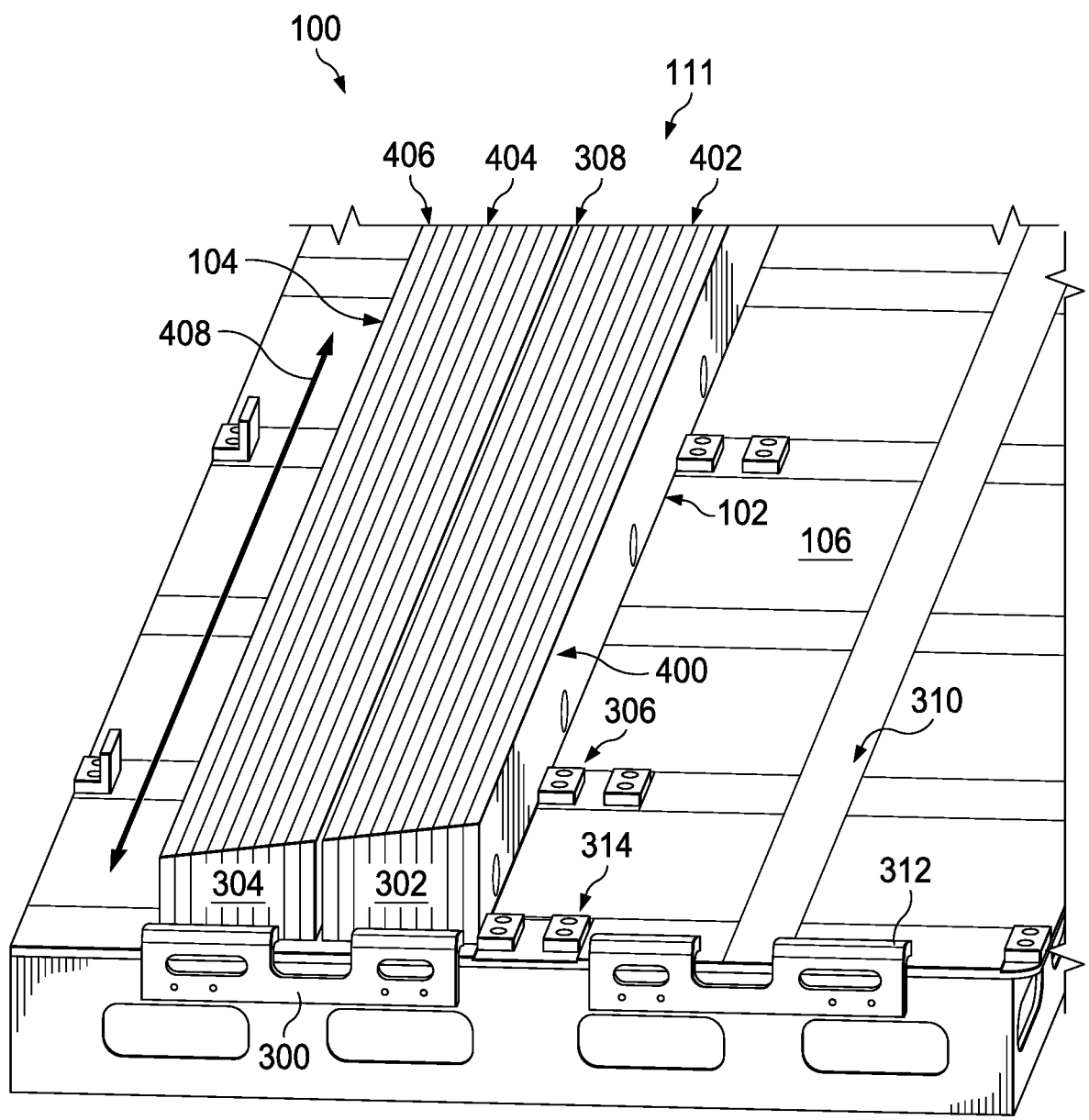
FIG. 4 is an illustration of an exposed view of mandrels in a composite manufacturing system in accordance with an illustrative embodiment.

Turning now to FIG. 4, an illustration of an exposed view of mandrels in a composite manufacturing system is depicted in accordance with an illustrative embodiment. The internal configuration of mandrel 102 and mandrel 104 is shown in this view.

As illustrated, mandrel 102 comprises cured composite planks 400 and layers of flexible material 402. Layers of flexible material 402 are positioned in between each set of cured composite planks 400.

Mandrel 104 comprises cured composite planks 404 and layers of flexible material 406. Layers of flexible material 406 are positioned in between each set of cured composite planks 404. The outer covering of mandrel 104 also may be made from flexible material in this illustrative example.

Cured composite planks 400 and cured composite planks 404 run the entire length 408 of mandrel 102 and mandrel 104. Although ten planks are shown for each mandrel in this illustrative example, one or both mandrels may comprise any number of planks, layers of flexible material, or both. The size, shape, and thickness of the cured composite planks allows for versatility in stiffness.

Figure 5:
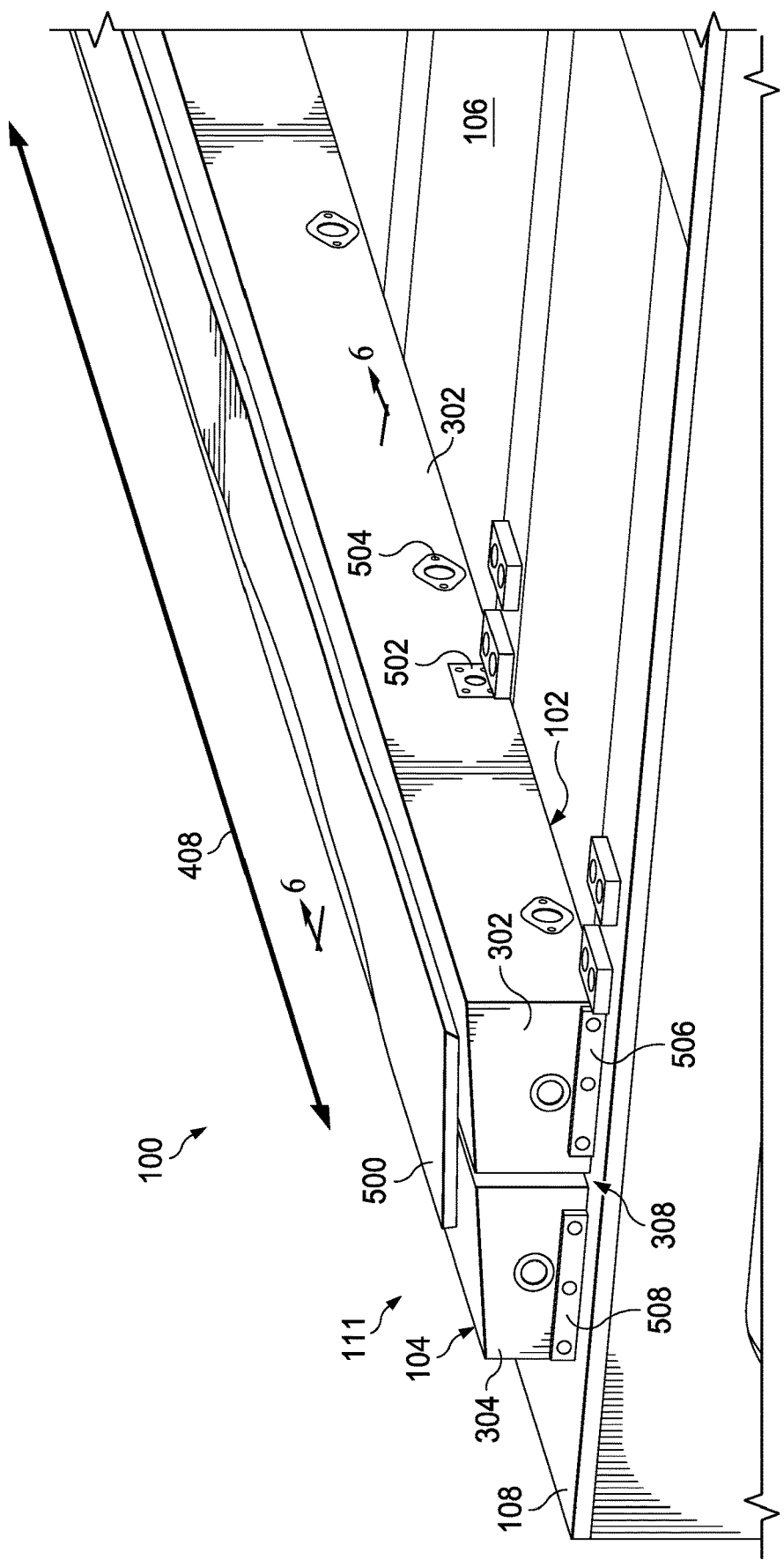
FIG. 5 is an illustration of a side perspective view of a composite manufacturing system in accordance with an illustrative embodiment.

In FIG. 5, an illustration of a side perspective view of a composite manufacturing system is depicted in accordance with an illustrative embodiment. Composite material 500 has been laid up on mandrel 102 and mandrel 104. Composite material 500 will form a stringer for an aircraft wing in this illustrative example.

As depicted, mandrel 102 has extraction features 502 and movement provisions 504. When curing is completed, an extraction tool may be connected to extraction features 502 to pull mandrel 102 apart from mandrel 104, making it easier to extract the cured composite stringer. Extraction features 502 are positioned at desired intervals along length 408 of mandrel 102.

During manufacturing, mandrel 102 may need to be moved to one or more different locations on the factory floor. Movement provisions 504 are spaced at intervals along length 408 of mandrel 102 and may be connected to a movement system to move mandrel 102 to a desired location. Mandrel 104 has similar extraction features and movement provision, although they are not shown in this view.

End 302 of mandrel 102 has index plate 506. End 304 of mandrel 104 has index plate 508. Index plate 506 and index plate 508 are additional indexing features for mandrel 102 and mandrel 104, respectively. In some cases, index plate 506 and index plate 508 are not necessary.

Figure 6:
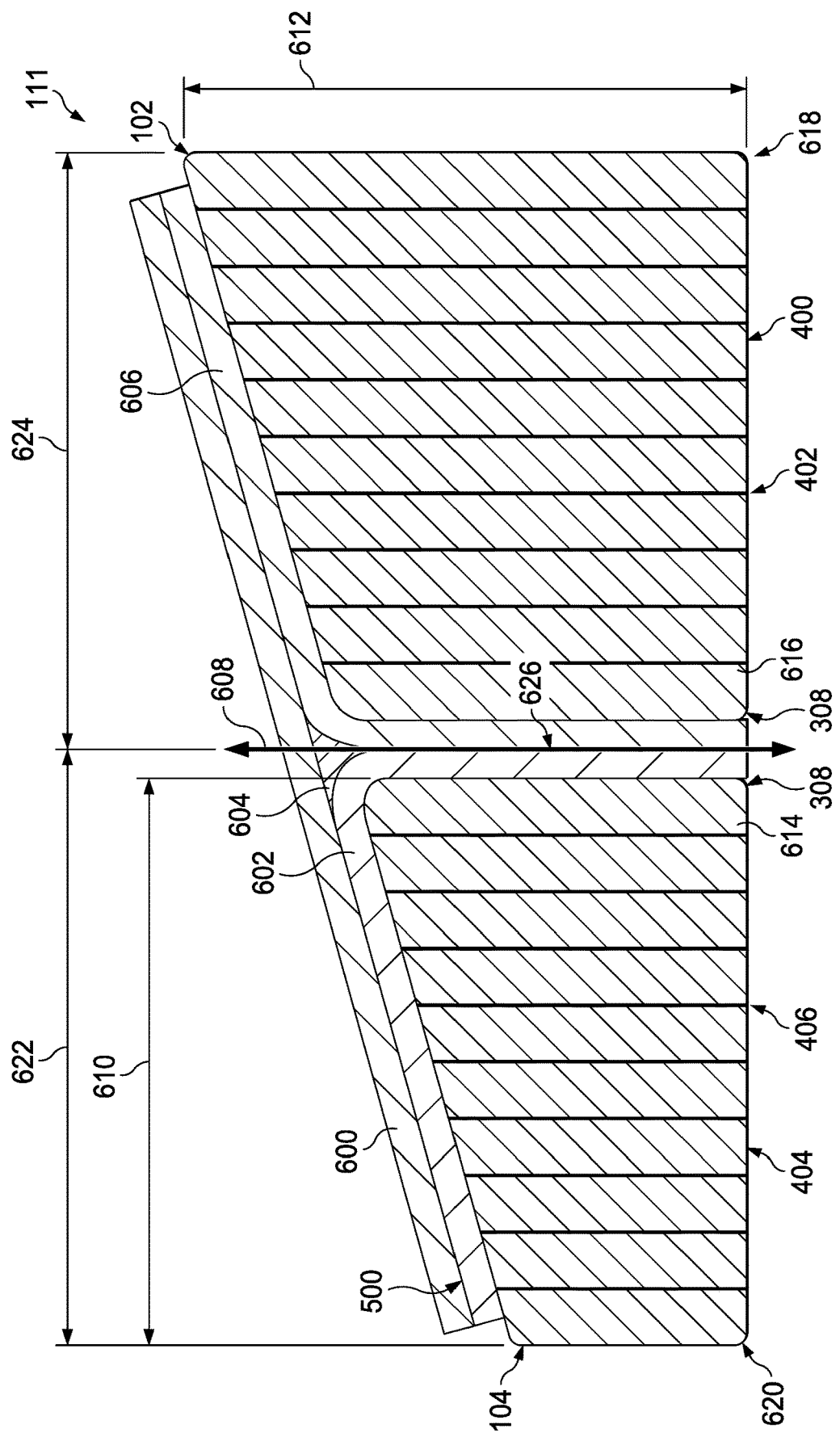
FIG. 6 is an illustration of a cross-sectional view of mandrels with composite material in accordance with an illustrative embodiment.

Turning next to FIG. 6, an illustration of a cross-sectional view of mandrels with composite material is depicted in accordance with an illustrative embodiment. A cross-sectional view of mandrel 102 and mandrel 104 with composite material 500 is shown along lines 6-6 in FIG. 5.

In this illustrative example, layer 600, layer 602, and layer 606 of composite material 500 have been laid up on mandrel 102 and mandrel 104 in a desired manner. Noodle 604 has been positioned in between the layers of composite material. Axis 608 represents the stringer centerline.

The configuration of planks and flexible material in mandrel 102 and mandrel 104 allows each mandrel to have a flexible direction and a rigid direction. Mandrel 104 is flexible in the direction of arrows 610. Mandrel 102 behaves in a similar fashion. Mandrel 102 is substantially rigid in the direction of arrows 612. Mandrel 104 behaves in a similar fashion.

As depicted, plank 614 in mandrel 104 and plank 616 in mandrel 102 are thicker than the other planks shown for each mandrel. In other illustrative examples, all planks may be the same or a different thickness from one another, depending on the particular implementation. Plank 614 and plank 616 are common to the web of the stringer to ensure that plank bond seam features are not in close proximity to the critical radius.

Mandrel 102 and mandrel 104 have radius edges. The radius for each of radius edges 618 in mandrel 102 and radius edges 620 in mandrel 104 may be selected in a desired manner to reduce the stress on the vacuum bag around sharp edges, thereby reducing the risk of vacuum bag leaks and/or ruptures. In other illustrative examples, one or more edges may have a different shape.

Mandrel 104 has thickness 622 and mandrel 102 has thickness 624. In this illustrative example, thickness 622 and thickness 624 are substantially the same. In other illustrative examples, depending the configuration of the aircraft structure, thickness 622 and thickness 624 may be different. The slope of mandrel 102 and mandrel 104 is selected to form a desired shape for the stringer.

As illustrated, the flexible and rigid features in mandrel 102 and mandrel 104 allow them to flex toward web 626 of the composite structure during curing. Such deformation improves stringer quality.

Figure 7:
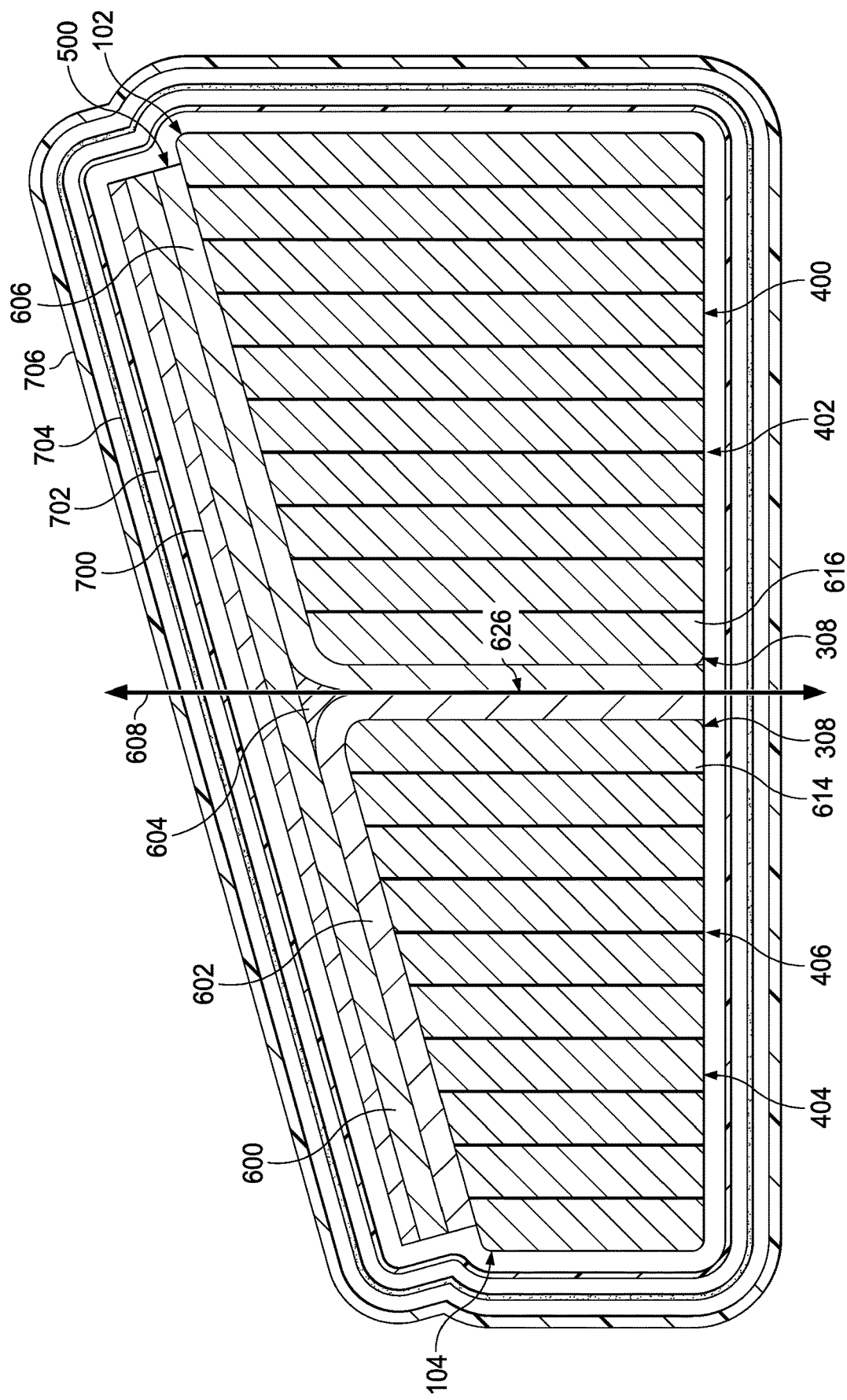
FIG. 7 is another illustration of a cross-sectional view of mandrels with composite material in accordance with an illustrative embodiment.

FIG. 7 shows another illustration of a cross-sectional view of mandrels with composite material in accordance with an illustrative embodiment. Curing components have been added to composite manufacturing system 100.

As illustrated, caul plate 700 has been positioned directly on top of composite material 500. Release film 702, breather 704, and vacuum bag 706 also surround mandrel 102, mandrel 104, and composite material 500. After bagging, vacuum bag 706 is secured with tape. Composite material 500 may then be cured to form a stringer in accordance with an illustrative embodiment.

The curing components shown herein are just some examples of different components needed to cure composite material 500. Additional cauls, breathers, and films may be needed. A breather may have one thickness throughout or may have different thicknesses in different parts of the tool it covers. These components may be pre-assembled as a group and rolled out onto the mandrels or each positioned individually.

Figure 8:
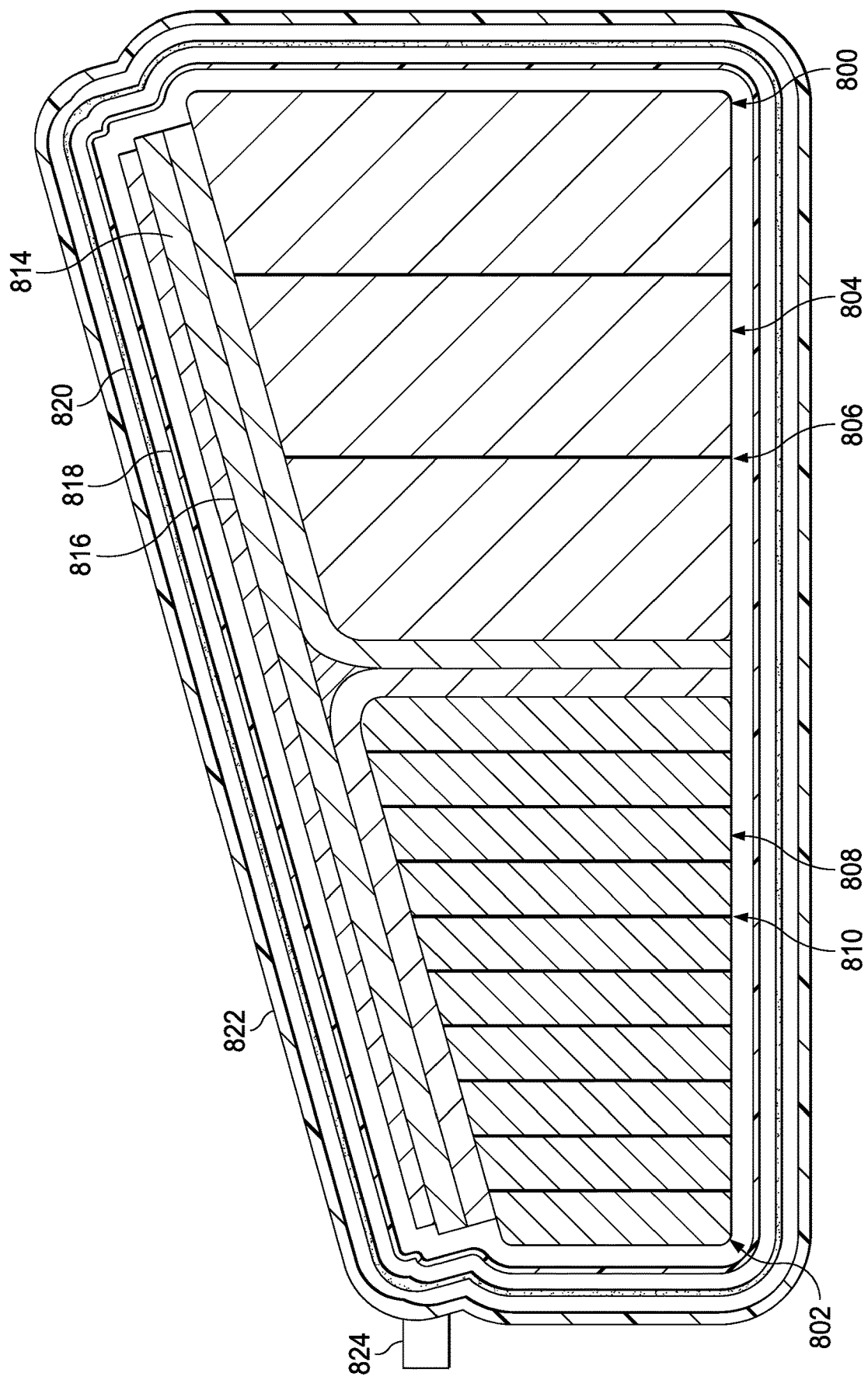
FIG. 8 is an illustration of an alternative design for mandrels in a composite manufacturing system in accordance with an illustrative embodiment.

With reference next to FIG. 8, an illustration of an alternative design for mandrels in a composite manufacturing system is depicted in accordance with an illustrative embodiment. A cross-sectional view of mandrel 800 and mandrel 802 is shown. Mandrel 800 and mandrel 802 are examples of physical implementations for first mandrel 236 and second mandrel 238, respectively, in FIG. 2.

Mandrel 800 comprises cured composite planks 804 and layers of flexible material 806 between them. Mandrel 802 comprises cured composite planks 808 and layers of flexible material 810 between them. Composite material 814 has been laid up on mandrel 800 and mandrel 802.

Mandrel 800 and mandrel 802 highlight the versatility and design flexibility a manufacturer has with use of an illustrative embodiment. In this illustrative example, mandrel 800 has three of cured composite planks 804, while mandrel 802 has ten cured composite planks 808. As a result, mandrel 802 is more flexible than mandrel 800.

Caul plate 816, release film 818, breather 820, and vacuum bag 822 surround mandrel 800 and mandrel 802 in this illustrative example. Sealant tape 824 secures vacuum bag 822 to prevent air leakage.

The different components shown in FIG. 1 and FIGS. 3-8 may be combined with components in FIG. 2, used with components in FIG. 2, or a combination of the two. Additionally, some of the components in FIG. 1 and FIGS. 3-8 may be illustrative examples of how components shown in block form in FIG. 2 may be implemented as physical structures.

Other configurations for composite manufacturing system 100 may be implemented other than those shown in FIGS. 3-8. For example, a number of additional mandrels may be used to form the composite structure. In other illustrative examples, the shape and thickness of the mandrels, cured composite planks, or layers of composite material may be different than those shown herein. In still other illustrative examples, the cured composite planks may be segmented along the length of the mandrel. In other words, instead of having one long pre-cured composite plank, two or more segments may be used.

Figure 9:
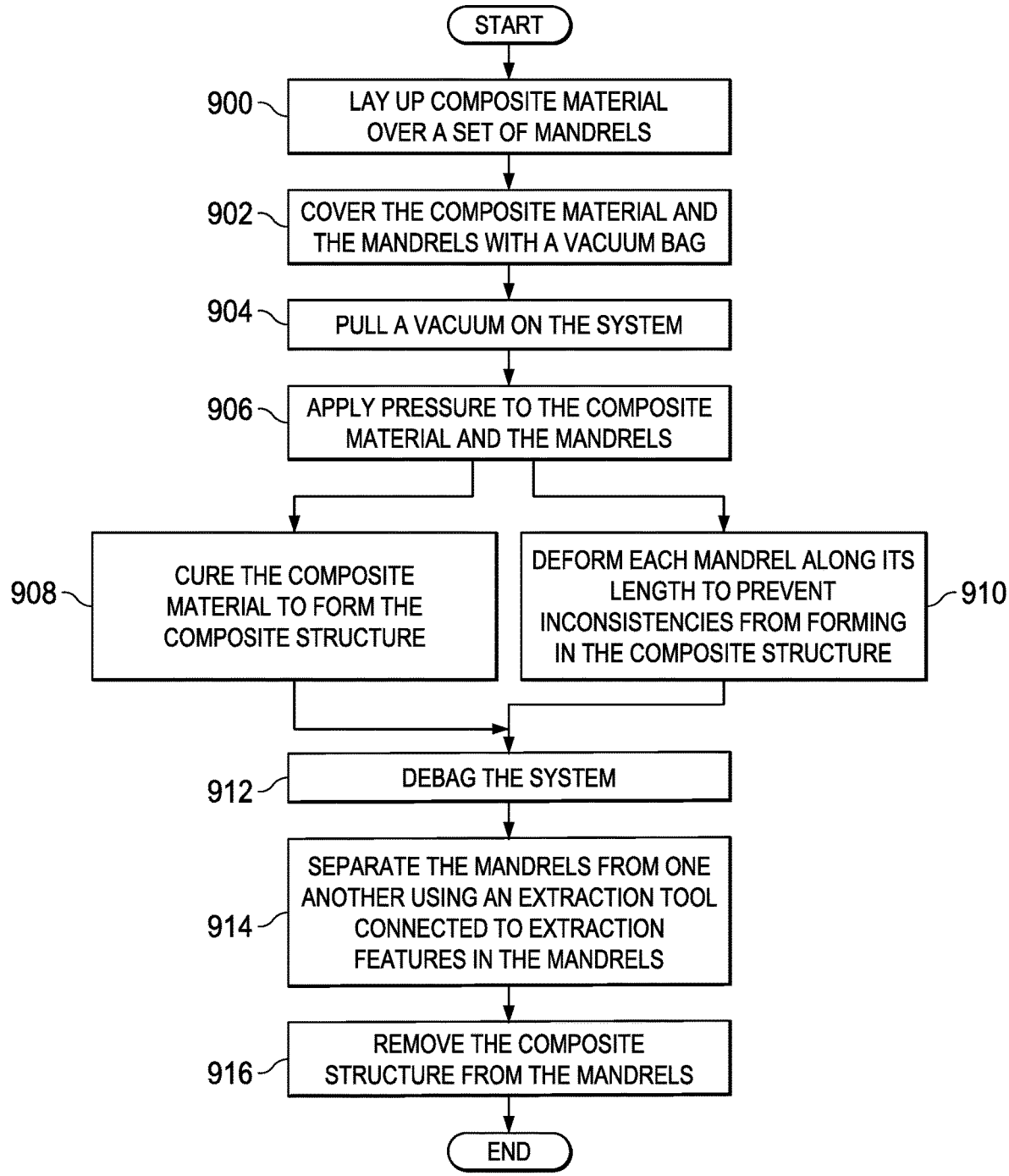
FIG. 9 is an illustration of a flowchart of a process for forming a composite structure for an aircraft in accordance with an illustrative embodiment.

With reference next to FIG. 9, an illustration of a flowchart of a process for forming a composite structure for an aircraft is depicted in accordance with an illustrative embodiment. The method depicted in FIG. 9 may be used to form composite structure 204 for aircraft 208 shown in FIG. 2.

The process beings by laying up composite material over a set of mandrels (operation 900). Each mandrel comprises cured composite planks running parallel to each other and layers of flexible material positioned between and bonded to the cured composite planks. Prior to operation 900, the orientation of the mandrels may be adjusted as desired using a combination of the tool base and the support structure.

Next, the composite material and the mandrels are covered with a vacuum bag (operation 902). A vacuum is pulled on the system (operation 904). Pressure is applied to the composite material and the mandrels by the vacuum bag (operation 906).

The composite material is then cured to form the composite structure (operation 908). During operation 908, each mandrel deforms along its length to prevent inconsistencies from forming in the composite structure (operation 910).

After curing, the system is debagged (operation 912). Additional processes may be performed on the composite structure. The mandrels are separated from one another using an extraction tool connected to extraction features in the mandrels (operation 914).

The composite structure is removed from the mandrels (operation 916), with the process terminating thereafter. Optionally, the mandrels may be moved to another location using a movement system connected to lifting provisions on each of the mandrels.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

Figure 10:
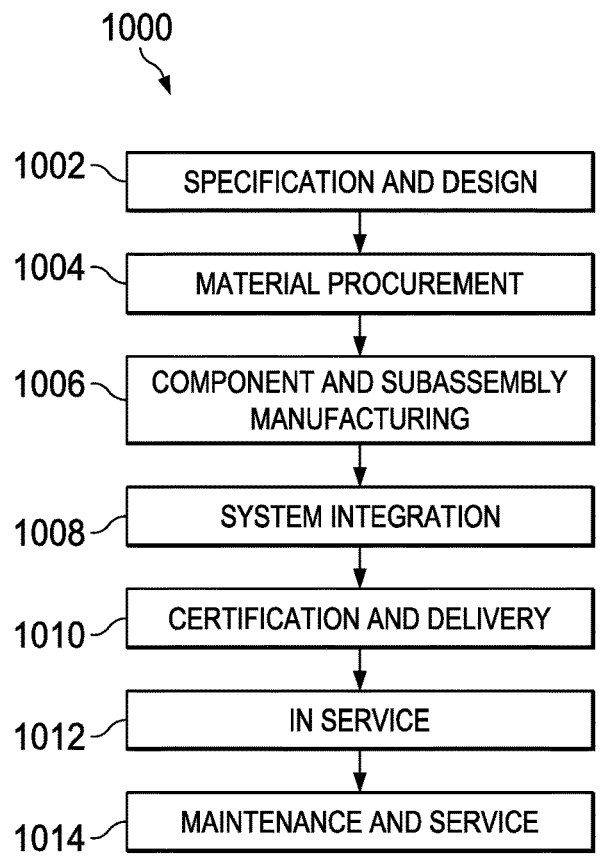
FIG. 10 is an illustration of a block diagram of an aircraft manufacturing and service method in accordance with an illustrative embodiment.
Figure 11:
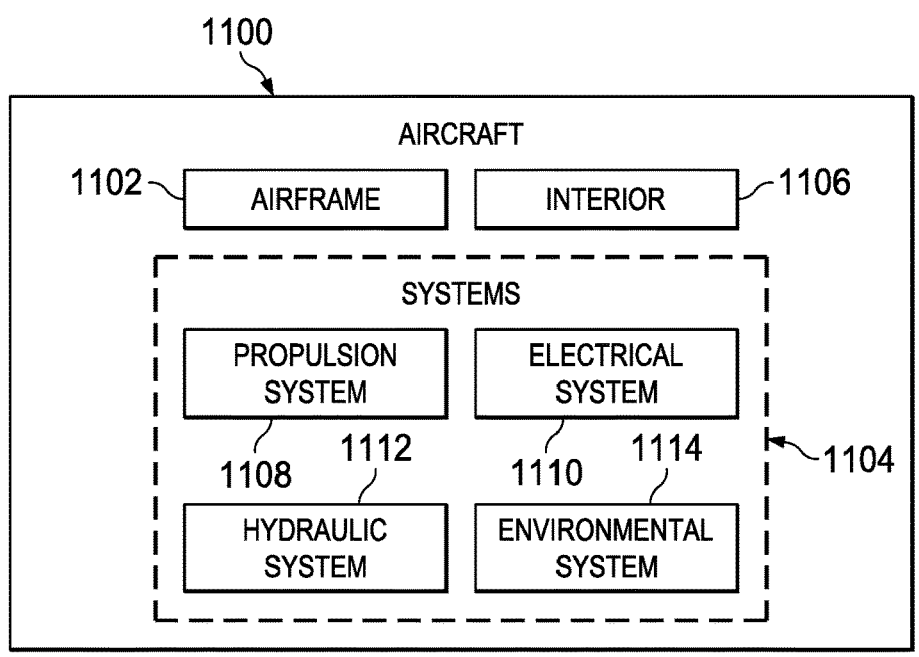
FIG. 11 is an illustration of a block diagram of an aircraft in which an illustrative embodiment may be implemented.

Illustrative embodiments of the disclosure may be described in the context of aircraft manufacturing and service method 1000 as shown in FIG. 10 and aircraft 1100 as shown in FIG. 11. Turning first to FIG. 10, an illustration of a block diagram of an aircraft manufacturing and service method is depicted in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Composite structure 204 from FIG. 2 formed using composite manufacturing system 202 may be made during component and subassembly manufacturing 1006. In addition, composite manufacturing system 202 may be used to modify parts made for routine maintenance and service 1014 as part of a modification, reconfiguration, or refurbishment of aircraft 1100 in FIG. 11. First mandrel 236 and second mandrel 238 may be used to form composite parts in either component and subassembly manufacturing 1006 or routine maintenance and service 1014.

Each of the processes of aircraft manufacturing and service method 1000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of a block diagram of an aircraft is depicted in which a composite structure made using an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000 in FIG. 10.

In one illustrative example, components or subassemblies produced in component and subassembly manufacturing 1006 in FIG. 10 may be fabricated or manufactured in a manner similar to components or subassemblies produced while aircraft 1100 is in service 1012 in FIG. 10. As yet another example, one or more apparatus embodiments, method embodiments, or a combination thereof may be utilized during production stages, such as component and subassembly manufacturing 1006 and system integration 1008 in FIG. 10. One or more apparatus embodiments, method embodiments, or a combination thereof may be utilized while aircraft 1100 is in service 1012, during maintenance and service 1014 in FIG. 10, or both. The use of a number of the different illustrative embodiments may substantially expedite the assembly of aircraft 1100, reduce the cost of aircraft 1100, or both expedite the assembly of aircraft 1100 and reduce the cost of aircraft 1100.

With the use of an illustrative embodiment, manufacturing composite structures for aircraft applications takes less time than with currently used systems. Mandrels used to form stringers will flex and twist in a desired manner, thus substantially reducing any inconsistencies seen in the stringer web. The design of each mandrel can be tailored to the needs the manufacturer, the platform, and the part to provide a desired level of stiffness to promote laminate quality.

The illustrative embodiments also allow for pre-made bagging to be used. A single bag may be employed instead of multiple bags, thus saving time during bagging and reducing the risk of leakage. The system no longer needs to be cleaned and taped to accommodate multiple bags.

Additionally, human operators have the benefit of ergonomically designed tool movement using the tooling base and support structure, further reducing the risk of injury and saving time during manufacturing. The tool base is designed to secure the mandrels such that they can deform in a desired manner without slippage.

Extraction features, index features, and lifting provisions allow quick mechanical release of the part and movement of the assembly on the factory floor. Since the mandrels are made of composite materials, they are light-weight compared to their metal counterparts. Mandrels in accordance with an illustrative embodiment substantially reduce inconsistencies and provide quality laminates in long, complex aircraft structures.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A composite manufacturing system comprising:
   a tool for forming a composite structure, the tool comprising:
   cured composite planks running parallel to each other; and
   layers of flexible material positioned between and bonded to the cured composite planks;
   a first mandrel having a first plurality of cured composite planks of the cured composite planks and a first number of layers of flexible material of the layers of flexible material, wherein the first mandrel is used to form a forward portion of an aircraft structure; and
   a second mandrel having a second plurality of cured composite planks of the cured composite planks and a second number of layers of flexible material of the layers of flexible material, wherein the second mandrel is used to form an aft portion of the aircraft structure; and
   a vacuum bag surrounding the tool and configured to apply pressure to the tool.

2. The composite manufacturing system of claim 1, wherein the tool is configured to deform in response to the pressure and prevent inconsistencies from developing in the composite structure during curing.

3. The composite manufacturing system of claim 2 further comprising:

a tool base configured to hold the tool in place as it deforms during curing.

4. The composite manufacturing system of claim 1, wherein the tool is configured to flex along its length toward a web of the composite structure.

5. The composite manufacturing system of claim 4, wherein the cured composite planks are aligned adjacent to one another along the length of the tool.

6. The composite manufacturing system of claim 1, wherein the tool further comprises:
a number of extraction features associated with the first mandrel and the second mandrel, wherein the number of extraction features is configured to connect to an extraction tool used to separate the first mandrel from the second mandrel.

7. The composite manufacturing system of claim 1, wherein the tool has a desired stiffness determined by at least one of a number, a thickness, or a shape of the cured composite planks.

8. The composite manufacturing system of claim 1, wherein the tool further comprises:
a number of indexing features configured to aid in aligning composite material on the tool.

9. The composite manufacturing system of claim 1, wherein the tool further comprises:
a plurality of lifting provisions configured to connect to a movement system that lifts the tool.

10. A method for forming a composite structure, the method comprising:
laying up composite material over a tool, wherein the tool comprises a first mandrel having a first plurality of cured composite planks running parallel to each other and a first number of layers of flexible material positioned between and bonded to the first plurality of cured composite planks, and a second mandrel positioned adjacent to the first mandrel, wherein the second mandrel has a second plurality of cured composite planks running parallel to each other and a second number of layers of flexible material positioned between and bonded to the second plurality of cured composite planks;
covering the composite material and the tool with a vacuum bag;
applying pressure to the composite material and the tool using the vacuum bag; and
curing the composite material to form the composite structure, wherein the tool deforms along its length to prevent inconsistencies from forming in the composite structure during curing.

11. The method of claim 10, wherein the tool deforms by flexing along its length toward a web of the composite structure.

12. The method of claim 10 further comprising:
moving the tool in at least one of a vertical direction or a horizontal direction using a tool base.

13. The method of claim 10, further comprising:
connecting an extraction tool to extraction features located in the first mandrel and the second mandrel;
separating the first mandrel from the second mandrel to free the composite structure using the extraction tool; and
removing the composite structure from the first mandrel and the second mandrel.

14. The method of claim 13 further comprising:
connecting a movement system to a plurality of lifting provisions in the first mandrel and the second mandrel; and
moving the first mandrel, the second mandrel, and the composite structure.

15. A composite manufacturing system for forming an aircraft structure, the composite manufacturing system comprising:
a first mandrel having a first plurality of cured composite planks running parallel to each other and a first number of layers of flexible material positioned between and bonded to the first plurality of cured composite planks;
a second mandrel positioned adjacent to the first mandrel, wherein the second mandrel has a second plurality of cured composite planks running parallel to each other and a second number of layers of flexible material positioned between and bonded to the second plurality of cured composite planks; and
a vacuum bag surrounding the first mandrel and the second mandrel, the vacuum bag configured to apply pressure to a composite material positioned over the first mandrel and the second mandrel to form the aircraft structure.

16. The composite manufacturing system of claim 15 further comprising:
a tool base configured to hold the first mandrel and the second mandrel in place.

17. The composite manufacturing system of claim 16 further comprising:
a support structure associated with the tool base and configured to move in at least one of a vertical direction or a horizontal direction.

18. The composite manufacturing system of claim 15, wherein the first mandrel and the second mandrel are configured to deform in response to the pressure and prevent inconsistencies from developing in the aircraft structure during curing.

19. The composite manufacturing system of claim 15, wherein at least one of the first mandrel or the second mandrel is tuned to a desired stiffness based on varying a thickness of at least one of the first plurality of cured composite planks or the second plurality of cured composite planks.

20. The composite manufacturing system of claim 15 further comprising:
a number of extraction features associated with the first mandrel and the second mandrel, wherein the number of extraction features is configured to connect to an extraction tool used to separate the first mandrel from the second mandrel.

* * * * *